United States Patent [19]
Phillips et al.

[11] Patent Number: 5,490,168
[45] Date of Patent: Feb. 6, 1996

[54] METHOD AND SYSTEM FOR AUTOMATIC OPTIMIZATION OF DATA THROUGHPUT USING VARIABLE PACKET LENGTH AND CODE PARAMETERS

[75] Inventors: Sharon E. T. Phillips, Lake in the Hills; Scott N. Carney, Palatine, both of Ill.

[73] Assignee: Motorola, Inc., Schaumburg, Ill.

[21] Appl. No.: 272,403

[22] Filed: Jul. 8, 1994

[51] Int. Cl.⁶ .............................. H04B 17/00; G06F 11/00
[52] U.S. Cl. .............................. 375/224; 370/13; 370/79; 370/94.1; 371/5.1; 340/825.56
[58] Field of Search ....................... 375/219, 224, 375/359–360; 370/13, 13.1, 79, 82–84, 94.1, 110.1; 371/5.1, 5.5; 340/825.3, 825.56

[56] References Cited

U.S. PATENT DOCUMENTS 4,701,923 10/1987 Fukasawa et al. ................ 371/5.5
5,150,368 9/1992 Autruong et al. ................ 371/5.1

OTHER PUBLICATIONS

Kurtis J. Guth and Tri T. Ha, "An Adaptive Stop–and–Wait ARQ Strategy for Mobil Data Communications", 40th IEEE Vehicular Technology Conference Proceedings, Orlando, FL. May 6–9, 1990 pp. 656–661.
J. A. C. Martins and J. deCarvalho Alves, "ARQ Protocols with Adaptive Block Size Perform Better Over a Wide Range of Bit Error Rates", IEEE Transactions on Communications, vol. 38, No. 6, Jun. 1990, pp. 737–739.
D. M. Mandelbaum, "An Adaptive–Feedback Coding Scheme Using Incremental Redundancy", IEEE Transactions on Information Theory, May 1974, pp. 388–389.

Primary Examiner—Young T. Tse
Attorney, Agent, or Firm—Darleen J. Stockley

[57] ABSTRACT

A method and communication system provide for automatic optimization of data throughput by adjusting the encoder to use a long packet length and an increased channel coding efficiency during periods of low error counts and a short packet length and an increased channel coding redundancy during periods of high error counts.

8 Claims, 4 Drawing Sheets

METHOD AND SYSTEM FOR AUTOMATIC OPTIMIZATION OF DATA THROUGHPUT USING VARIABLE PACKET LENGTH AND CODE PARAMETERS

FIELD OF THE INVENTION

The present invention relates to data communication networks, and more particularly to optimizing data throughput in communication networks.

BACKGROUND

The transmission medium and impairments to a communication channel due to noise and interference typically cause errors in data sent through communication networks. Where the channel error-rate has wide variations, use of forward error correction techniques can be inefficient. The inefficiency is brought about by the constant transmission of a large amount of redundancy so that heavily-errored patterns will not be interpreted incorrectly. The redundancy must always be transmitted even though the heavily-errored patterns may be rare. In addition, forward error correction algorithms have a tendency to require complex or computationally intensive decoders to determine which bits are incorrect.

Conventional automatic repeat request (ARQ) algorithms which packetize data, detect errors, and request retransmission of packets are implemented with less complexity than forward error correction methods but are still vulnerable to the design compromise of including large amounts of redundancy in order to avoid falsing on receive sequences containing large numbers of errors.

Thus, there is a need for a method and a communication system having efficient and highly reliable error-detection that automatically optimize data throughput of a channel.

SUMMARY OF THE INVENTION

A method and communication system provide for automatic optimization of data throughput by adjusting the encoder to use a long packet length and an increased channel coding efficiency during periods of low error counts and a short packet length and an increased channel coding redundancy during periods of high error counts.

BRIEF DESCRIPTIONS OF THE DRAWINGS

DETAILED DESCRIPTION OF A PREFERRED EMBODIMENT

The present invention provides a method and a communication system having efficient and highly-reliable error-detection that automatically optimize data throughput of a channel whose error properties vary over time by selecting a length of a packet and a channel coding rate in a packet such that data throughput is maximized during periods when relatively few errors are found in packets and data redundancy is increased to provide a more robust system during periods when the number of errors of three particular types of errors exceeds three respective predetermined threshold levels.

Figure 1:
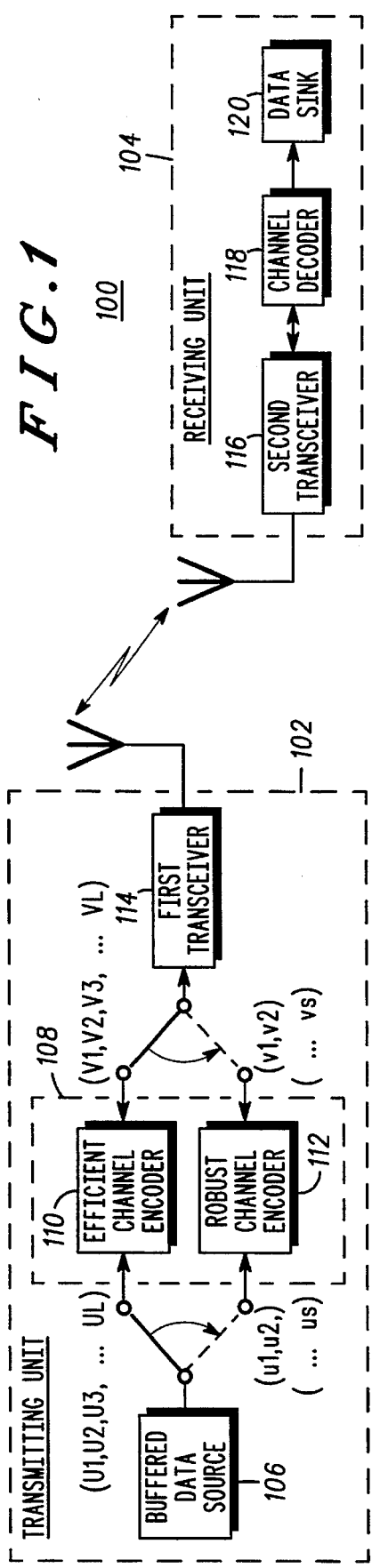
FIG. 1 is a block diagram of a communication system that operates in accordance with the method of the present invention.

FIG. 1, numeral 100, is a block diagram of a communication system that operates in accordance with the method of the present invention. The invention includes a communication system for maximizing channel efficiency in a data channel having varying transmission error conditions, wherein the communication system includes a transmitting unit (102) and a receiving unit (104), described more fully as follows. The transmitting unit (102) includes: a buffered data source (106), for providing data for transmitting; a selectable encoder (108), operably coupled to the buffered data source (106), for encoding the data into packets in accordance with a predetermined scheme using one of: an efficient channel encoder (110) and a robust channel encoder (112); a first transceiver (114), operably coupled to the selectable encoder (108), for transmitting the packets of data to the receiving unit (104) and for receiving error information from the receiving unit (104).

Buffered data source (106) provides a stream of data bits which may be grouped in information vectors U1, U2, ..., UL, where L is a first predetermined integer, and the channel encoder (110) typically maps the vectors into channel vectors V1, V2, ..., VL, or alternatively, buffered data source (106) provides a stream of data bits which may be grouped in information vectors u1, u2, ..., us, where s is a second predetermined integer, and the channel encoder (112) then typically maps the vectors into channel vectors v1, v2, ..., vs. In the preferred embodiment, L is selected to be greater than S.

The receiving unit (104) includes: a second transceiver (116), for receiving the transmitted data from the first transceiver (114) and transmitting error information from a channel decoder (118) of the receiving unit (104); the channel decoder (118), operably coupled to the second transceiver (116), for decoding the received data and determining the error information wherein at least one of a–d: a) upon receiving a packet and determining that at least a predetermined number of codewords of the packet have errors, sending a signal for resetting the selectable encoder (108) of the transmitting unit (102) from a first predetermined channel coding rate to a second predetermined channel coding rate and changing a packet length from a first predetermined packet length to a second predetermined packet length and resetting the channel decoder (118) of the receiving unit (104) accordingly, b) upon requesting a predetermined number of retransmissions and receiving the same packet having errors, sending a signal for resetting the selectable encoder (108) of the transmitting unit (102) from a first predetermined channel coding rate to a second predetermined channel coding rate and changing a packet length from a first predetermined packet length to a second predetermined packet length and resetting the channel decoder (118) of the receiving unit (104) accordingly, c) upon receiving a packet having a codeword with an error count greater than a predetermined threshold, sending a signal for resetting the selectable encoder (108) of the transmitting unit (102) from a first predetermined channel coding rate to a second predetermined channel coding rate and changing a packet length from a first predetermined packet length to a second predetermined packet length and resetting the channel decoder (118) receiving unit (104) accordingly, and d) upon receiving a predetermined number of consecutive error-free packets, sending a signal for resetting the selectable encoder (108) of the transmitting unit (102) from a second predetermined channel coding rate to a first predetermined channel coding rate and changing a packet length from a second predetermined packet length to a first predetermined packet length and resetting the channel decoder (118) of the receiving unit (104) accordingly; and a data sink (120), operably coupled to the channel decoder (118), for receiving decoded received data. For (a)–(d), the second predetermined channel coding rate is less than the first predetermined channel coding rate and the second predetermined packet length is less than the first predetermined packet length.

Typically, for a 2.4 GHz propagation environment and a nominal one Megabit per second data transmission rate, the first predetermined channel coding rate is approximately 97 per cent and the second predetermined channel coding rate is approximately 70 per cent. For a 2.4 GHz propagation environment and a nominal one Megabit per second data transmission rate, the first predetermined packet length is generally in a range from 15 ms to 50 ms and the second predetermined packet length is in a range from 1 ms to 5 ms.

Figure 2:
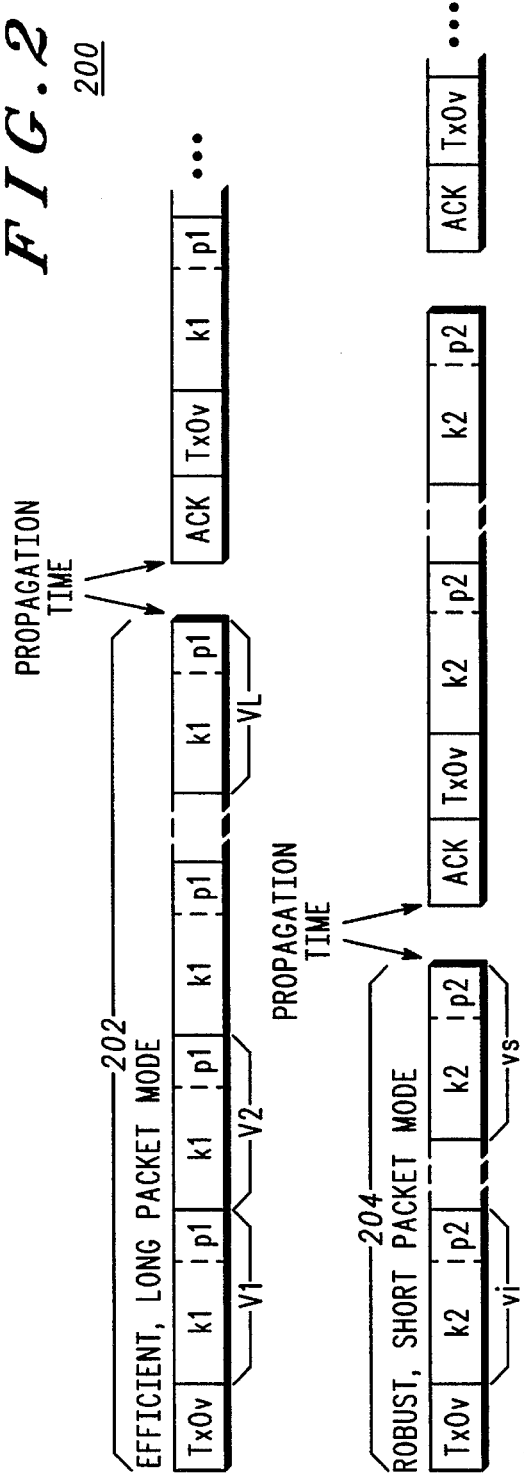
FIG. 2 illustrates the format of the efficient, long packet mode and the robust, short packet mode.

FIG. 2, numeral 200, illustrates the format of the efficient, long packet mode and the robust, short packet mode. The diagram depicts allocation of time from the perspective of the selectable encoder (108) of the transmitting unit (102). Transmitted packets include transmitter overhead time, TxOv, which is fixed and independent of packet length and channel coding rate. Also independent of packet length and channel coding rate are the time, ACK, for first transceiver (114) to receive acknowledgment from second transceiver (116). A third time period, propagation time, is dependent on physical separation of transmitting unit (102) and receiving unit (104) but like TxOv and ACK independent of packet length and channel coding rate.

In the efficient, long-packet mode (202) packets include L equal-length codewords, V1 through VL, each of which is comprised of information data bits requiring time, k1, to transmit and parity (redundancy) bits requiring time, p1, to transmit.

In the robust, short-packet mode (204) packets include s equal-length codewords, v1 through vs, each of which is comprised of information data bits requiring time, k2, to transmit and parity (redundancy) bits requiring time, p2, to transmit with second channel coding rate, k2/(k2+p2) less than first channel coding rate, k1/(k1+p1).

Typically, for a 2.4 GHz propagation environment and a nominal one Megabit per second data transmission rate, (TxOv+propagation time+ACK) is in the range of 150 microseconds to 400 microseconds, codeword lengths k1+p1=k2+p2= 1 millisecond, k1=970 microseconds, k2=700 microseconds; L=15 to 50 codewords, and s=1 to 5 codewords.

Figure 3:
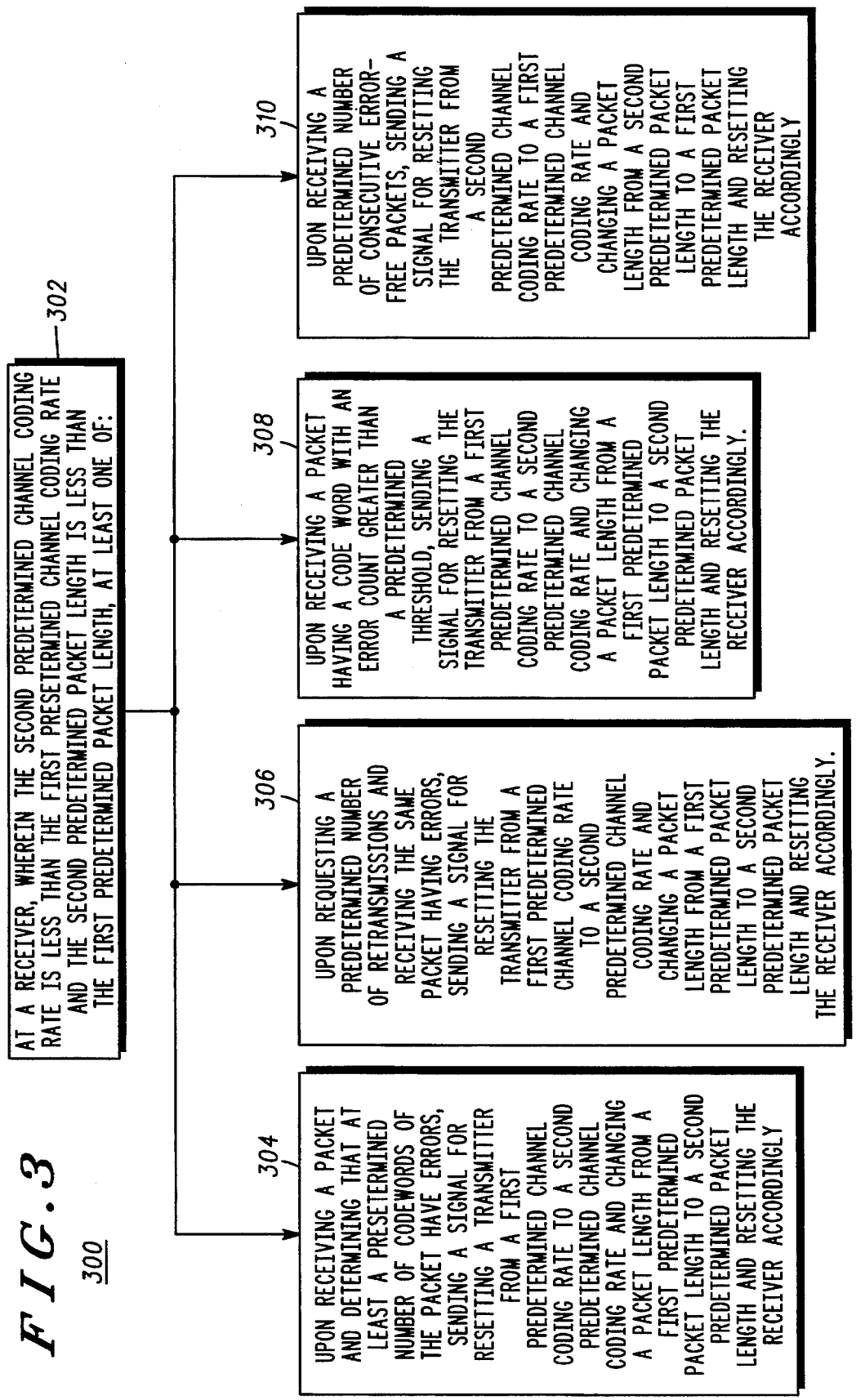
FIG. 3 is a flow chart of an embodiment of steps in accordance with the method of the present invention.

FIG. 3, numeral 300, is a flow chart of an embodiment of steps in accordance with the method of the present invention. The method provides for maximizing channel efficiency in a data channel having varying transmission error conditions and includes the steps of at least one of a–d: a) upon receiving a packet and determining that at least a predetermined number of codewords of the packet have errors, sending a signal for resetting a transmitter from a first predetermined channel coding rate to a second predetermined channel coding rate and changing a packet length from a first predetermined packet length to a second predetermined packet length and resetting the receiver accordingly (304); b) upon requesting a predetermined number of retransmissions and receiving the same packet having errors, sending a signal for resetting the transmitter from a first predetermined channel coding rate to a second predetermined channel coding rate and changing a packet length from a first predetermined packet length to a second predetermined packet length and resetting the receiver accordingly (306); c) upon receiving a packet having a codeword with an error count greater than a predetermined threshold, sending a signal for resetting the transmitter from a first predetermined channel coding rate to a second predetermined channel coding rate and changing a packet length from a first predetermined packet length to a second predetermined packet length and resetting the receiver accordingly (308); and d) upon receiving a predetermined number of consecutive error-free packets, sending a signal for resetting the transmitter from a second predetermined channel coding rate to a first predetermined channel coding rate and changing a packet length from a second predetermined packet length to a first predetermined packet length and resetting the receiver accordingly (310), wherein, for (a)–(d) the second predetermined channel coding rate is less than the first predetermined channel coding rate and the second predetermined packet length is less than the first predetermined packet length (302).

When the method of FIG. 3 is implemented in a 2.4 GHz propagation environment using a nominal one Megabit per second data transmission rate, the first predetermined channel coding rate is typically approximately 97 per cent and the second predetermined channel coding rate is approximately 70 per cent. When the method of FIG. 3 is implemented in a 2.4 GHz propagation environment using a nominal one Megabit per second data transmission rate, the first predetermined packet length is generally in a range from 15 ms to 50 ms and the second predetermined packet length is in a range from 1 ms to 5 ms.

Figure 4:
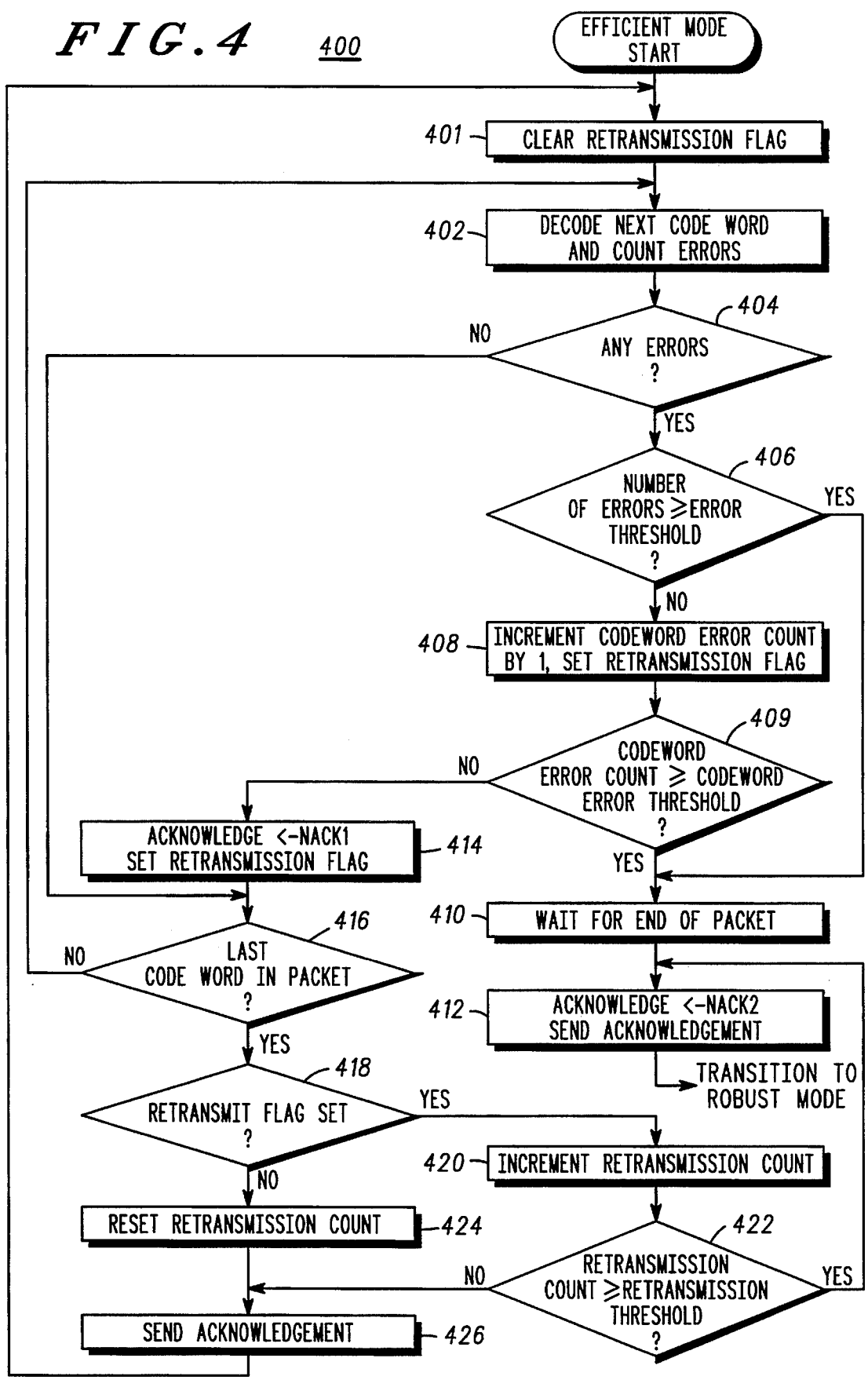
FIG. 4 is a flow chart showing a particular embodiment of the method of the present invention wherein the input packet is in the efficient, long packet mode.

FIG. 4, numeral 400, is a flow chart showing a particular embodiment of the method of the present invention wherein the communication system is in the efficient, long packet mode. The method is used for maximizing channel efficiency for transmitting packets in a data channel having varying transmission error conditions and includes, for a received packet in the efficient mode, the steps of: a) clearing a retransmission flag for the received packet (401); b) decoding next available codeword in the packet and determining an error count of the codeword (402); c) determining whether the error count is $\geq 0$ (404); d) where the error count is>0 and where the error count is<the predetermined error threshold (406), incrementing the codeword error count by 1 and setting the retransmission flag (408), determining whether the codeword error count is$\geq$a predetermined codeword error threshold (409), and where the codeword error count is$\geq$the predetermined codeword error threshold, waiting for an end of the entire packet (410) and sending a message indicating that the packet failed and transitioning the receiver and a transmitter from a first predetermined channel coding rate to a second predetermined channel coding rate and changing a packet length from a first predetermined packet length to a second predetermined packet length, wherein, for the second predetermined channel coding rate is lower than the first predetermined channel coding rate and the second predetermined packet length is less than the first predetermined packet length (412) and transitioning to a robust mode; e) where the error count is>0 and where the error count is$\geq$the predetermined error threshold, waiting for an end of an entire packet (410) and sending a message indicating that the packet failed and transitioning the receiver and a transmitter from a first predetermined channel coding rate to a second predetermined channel coding rate and changing a packet length from a first predetermined packet length to a second predetermined packet length, wherein, for the second predetermined channel coding rate is lower than the first predetermined channel coding rate and the second predetermined packet length is less than the first predetermined packet length (412) and transitioning to a robust mode, and where the codeword error count is<the predetermined codeword error threshold, upon receiving the entire packet, setting a retransmission flag (414), and where one of: the error count is=0 (determined in 404) and the retransmission flag is set (414), determining whether a last codeword of the packet has been received (416), and where an intermediate codeword of the packet has been received, recycling to decoding a next available codeword (402), and where a last codeword of the packet has been received, checking whether the retransmission flag is set (418), and where the retransmission flag has been set, incrementing a retransmission count (420), determining whether a retransmission count is≧a predetermined retransmission threshold (422), and where the predetermined retransmission count is≧the predetermined retransmission threshold, sending a message indicating that the packet failed and transitioning the receiver and a transmitter from a first predetermined channel coding rate to a second predetermined channel coding rate and changing a packet length from a first predetermined packet length to a second predetermined packet length, wherein the second predetermined channel coding rate is less than the first predetermined channel coding rate and the second predetermined packet length is less than the first predetermined packet length (412) and transitioning to the robust mode, and where the predetermined retransmission count is<the predetermined retransmission threshold, sending the message indicating that the transmission failed and that the packet should be retransmitted, and where the retransmission flag is clear, resetting a transmission count, sending the message indicating that the transmission is successful (426) and recycling to clearing a retransmission flag (401).

Figure 5:
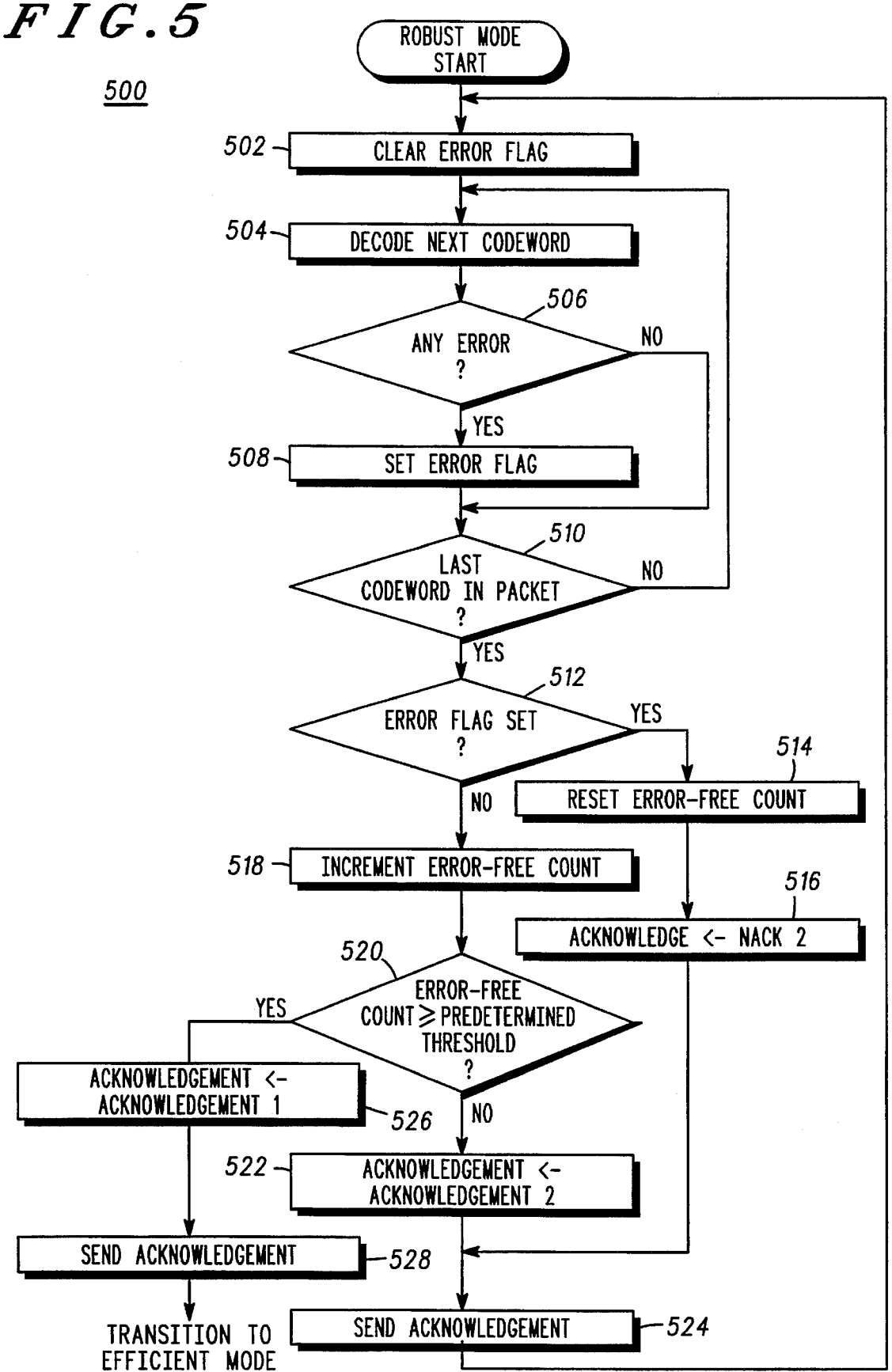
FIG. 5 is a flow chart showing another embodiment of the method of the present invention wherein the input packet is in the robust, short packet mode.

FIG. 5, numeral 500, is a flow chart showing another embodiment of the method of the present invention wherein the input packet is in the robust, short packet mode. The method provides for maximizing channel efficiency for transmitting packets in a data channel having varying transmission error conditions, comprising the steps of, for a received packet: a) clearing an error flag of the received packet (502); b) decoding a next available codeword of the received packet (504); c) determining whether there are error(s) in the codeword (506); d) where there is at least a first error in the codeword, setting the error flag (508) and determining whether the codeword is a last codeword of the packet (510); e) where the codeword is error-free, determining whether the codeword is a last codeword of the packet (510); f) where the codeword is an intermediate codeword of the packet, recycling to decoding a next codeword (504); g) where the codeword is a last codeword of the packet, checking whether the error flag is set (512); g) where the error flag is set, resetting an error-free count (514), sending the message indicating that the transmission failed and that the packet should be retransmitted (516, 524) and recycling to clearing the error flag (502); h) where the error flag is clear, incrementing the error-free count (518) and determining whether the error free count is≧a predetermined threshold (520); i) where the error free count is< a predetermined threshold, sending the message indicating that the transmission is successful (522, 524) and recycling to clearing the error flag (502); j) where the error free count is≧ a predetermined threshold, sending a message indicating that the packet is successful (526, 528) and transitioning the receiver and a transmitter from a second predetermined channel coding rate to a first predetermined channel coding rate and changing a packet length from a second predetermined packet length to a first predetermined packet length, wherein, for the first predetermined channel coding rate is greater than the second predetermined channel coding rate and the first predetermined packet length is greater than the second predetermined packet length.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for maximizing channel efficiency in a data channel having varying transmission error conditions, comprising the steps of:

A) receiving a packet from a transmitting unit by a receiving unit;

B) adjusting, by the receiving unit, a selectable encoder of the transmitting unit, wherein at least one of C–F:

C) upon receiving, by a channel decoder of the receiving unit from a first transceiver of the transmitting unit, the packet and determining, by the channel decoder of the receiving unit, that at least a predetermined number of codewords of the packet have errors, C1) sending, by a second transceiver of the receiving unit, a signal for resetting the selectable encoder of the transmitting unit from a first predetermined channel coding rate to a second predetermined channel coding rate and changing a length of the packet from a first predetermined packet length to a second predetermined packet length and C2) resetting, by the second transceiver of the receiving unit, the channel decoder of the receiving unit accordingly, D) upon requesting, by the channel decoder of the receiving unit from the first transceiver of the transmitting unit, a predetermined number of retransmissions and receiving, by the channel decoder of the receiving unit, the same packet having errors, D1) sending, by the channel decoder of the receiving unit utilizing the second transceiver of the receiving unit, a signal for resetting the selectable encoder of the transmitting unit from the first predetermined channel coding rate to the second predetermined channel coding rate and changing the length of the packet from the first predetermined packet length to the second predetermined packet length and D2) resetting, by the second transceiver of the receiving unit, the channel decoder of the receiving unit accordingly, E) upon receiving, by the channel decoder of the receiving unit from the first transceiver of the transmitting unit, the packet having a codeword of the predetermined number of codewords of the packet with an error count greater than a predetermined threshold, E1) sending, by the channel decoder of the receiving unit utilizing the second transceiver of the receiving unit, a signal for resetting the transmitting unit from the first predetermined channel coding rate to the second predetermined channel coding rate and changing the length of the packet from the first predetermined packet length to the second predetermined packet length and E2) resetting, by the second transceiver of the receiving unit, the channel decoder of the receiving unit accordingly, F) upon receiving, by the channel decoder of the receiving unit from the first transceiver of the transmitting unit, a predetermined number of consecutive error-free packets, F1) sending, by the channel decoder of the receiving unit utilizing the second transceiver of the receiving unit, a signal for resetting the transmitting unit from the second predetermined channel coding rate to the first predetermined channel coding rate and changing the length of the packet from the second predetermined packet length to the first predetermined packet length and F2) resetting, by the second transceiver of the receiving unit, the channel decoder of the receiving unit accordingly, wherein, for steps C–F the second predetermined channel coding rate is less than the first predetermined channel coding rate and the second predetermined packet length is less than the first predetermined packet length.

2. The method of claim 1 wherein, for a 2.4 GHz propagation environment and a nominal one Megabit per second data transmission rate, the first predetermined channel coding rate is approximately 97 percent and the second predetermined channel coding rate is approximately 70 percent.

3. The method of claim 1 wherein, for a 2.4 GHz propagation environment and a nominal one Megabit per second data transmission rate, the first predetermined packet length is in a range from 15 ms to 50 ms and the second predetermined packet length is in a range from 1 ms to 5 ms.

4. A method for maximizing channel efficiency for transmitting packets in a data channel having varying transmission error conditions, wherein an input packet is in an efficient, long packet mode, comprising the steps of:

for a received packet:

A) clearing a retransmission flag for the received packet,

B) decoding a next available codeword in the received packet and determining an error count of the codeword, C) determining whether the error count is $\geq 0$, C1) where the error count is $>0$ and where the error count is $\geq$ a predetermined error threshold, waiting for an end of the received packet and sending a message indicating that the received packet failed and transitioning a receiving unit and a transmitting unit from a first predetermined channel coding rate to a second predetermined channel coding rate and changing a length of the received packet from a first predetermined packet length to a second predetermined packet length, wherein, for the second predetermined channel coding rate is lower than the first predetermined channel coding rate and the second predetermined packet length is less than the first predetermined packet length, C2) where the error count is $>0$ and where the error count is $<$ the predetermined error threshold, incrementing the codeword error count by 1 and setting the retransmission flag, C2b) determining whether the codeword error count is $\geq$ a predetermined codeword error threshold, C2b1) where one of C2b1a–C2b1b:

C2b1a) where the codeword error count is $\geq$ the predetermined codeword error threshold, upon receiving the received packet completely, sending a message indicating that the received packet failed and transitioning the receiving unit and the transmitting unit from the first predetermined channel coding rate to the second predetermined channel coding rate and changing the length of the received packet from the first predetermined packet length to the second predetermined packet length, wherein, for the second predetermined channel coding rate is lower than the first predetermined channel coding rate and the second predetermined packet length is less than the first predetermined packet length, C2b1b) where the error count is $<$ the predetermined codeword error threshold, waiting for the end of the received packet and sending a message indicating that the received packet failed and setting the retransmission flag;

D) where one of D1–D4:

D1) where the error count is $=0$,

D2) where the retransmission flag is set (step C2b1b), determining whether the last codeword of the received packet has been received, D3) where an intermediate codeword of the received packet has been received, recycling to step B), D4) where the last codeword of the received packet has been received, checking whether the retransmission flag is set, D4a) where the retransmission flag has been set, incrementing a retransmission count, D4b) determining whether the retransmission count is $\geq$ a predetermined retransmission threshold, D4b1) where the retransmission count is $\geq$ the predetermined retransmission threshold, sending a message indicating that the received packet failed and transitioning the receiving unit and the transmitting unit from the first predetermined channel coding rate to the second predetermined channel coding rate and changing the length of the received oacket from the first predetermined packet length to the second predetermined packet length, wherein the second predetermined channel coding rate is less than the first predetermined channel coding rate and the second predetermined packet length is less than the first predetermined packet length, D4b2) where the predetermined retransmission count is $<$ the predetermined retransmission threshold, sending the message indicating that the transmission failed and that the received packet should be retransmitted and recycling to step A), D4c) where the retransmission flag is clear, resetting the retransmission count, sending the message indicating that the transmission is successful and recycling to step A).

5. A method for maximizing channel efficiency for transmitting packets in a data channel having varying transmission error conditions, wherein an input packet is in a robust, short packet mode, comprising the steps of:

for a received packet:

A) clearing an error flag of the received packet,

B) decoding a next available codeword of the received packet,

C) determining whether there are errors in the codeword,

C1) where there is at least a first error in the codeword, setting the error flag and determining whether the codeword is the last codeword of the received packet, C2) where the codeword is error-free, determining whether the codeword is the last codeword of the received packet, D) where the codeword is an intermediate codeword of the received packet, recycling to step B)., E) where the codeword is the last codeword of the received packet, checking whether the error flag is set, E1) where the error flag is set, resetting an error-free count, sending a message indicating that the transmission failed and that the received packet should be retransmitted and recycling to step A), E2) where the error flag is clear, incrementing the error-free count and determining whether the error-free count is $\geq$ a predetermined codeword error threshold, E2a) where the error-free count is < the predetermined codeword error threshold, sending the message indicating that the transmission is successful and recycling to step A), E2b) where the error-free count is $\geq$ predetermined codeword error threshold, sending the message indicating that the received packet is successful and transitioning a receiving unit and a transmittina unit from a second predetermined channel coding rate to a first predetermined channel coding rate and changing a length of the received packet from a second predetermined packet length to a first predetermined packet length, wherein, for the first predetermined channel coding rate is greater than the second predetermined channel coding rate and the first predetermined packet length is greater than the second predetermined packet length.

6. A communication system for maximizing channel efficiency in a data channel having varying transmission error conditions, comprising:

at a transmitting unit:
A) a buffered data source, for providing data for transmitting, B) a selectable encoder, operably coupled to the buffered data source, for encoding the data into packets in accordance with a predetermined scheme using one of: an efficient channel encoder or a robust channel encoder, C) a first transceiver, operably coupled to the selectable encoder, for transmitting the packets of data to a receiving unit and for receiving error information from the receiving unit, at the receiving unit:
D) a second transceiver, for receiving a plurality of received packets of data from the first transceiver and transmitting the error information from a channel decoder of the receiving unit to the first transceiver, E) the channel decoder, operably coupled to the second transceiver, for decoding the plurality of received packets of data and determining the error information wherein the following steps F–G are implemented:

F) receiving a received packet of the plurality of received packets from the transmitting unit by the receiving unit; and G) adjusting, by the receiving unit, the selectable encoder of the transmitting unit, wherein one of H–K:

H) wherein:
H1) upon receiving, by the channel decoder of the receiving unit from the first transceiver of the transmitting unit, the received packet and H2) determining by the channel decoder of the receiving unit, that at least a predetermined number of codewords of the received packet have errors, H3) sending a signal for resetting the selectable encoder of the transmitting unit from a first predetermined channel coding rate to a second predetermined channel coding rate and changing a length of the received packet from a first predetermined packet length to a second predetermined packet length and H4) resetting the channel decoder of the receiving unit accordingly, I) wherein:
I1) upon requesting, by the channel decoder of the receiving unit from the first transceiver of the transmitting unit, a predetermined number of retransmissions and I2) receiving, by the channel decoder of the receiving unit, the same received packet having errors, I3) sending, by the channel decoder of the receiving unit, a signal for resetting the selectable encoder of the transmitting unit from the first predetermined channel coding rate to the second predetermined channel coding rate and changing the length of the received packet from the first predetermined packet length to the second predetermined packet length and I4) resetting the channel decoder of the receiving unit accordingly, J) wherein:
J1) upon receiving, by the channel decoder of the receiving unit from the first transceiver of the transmitting unit, the received packet of the plurality of received packets having a codeword with an error count greater than a predetermined threshold, J2) sending, by the channel decoder of the receiving unit, a signal for resetting the selectable encoder of the transmitting unit from the first predetermined channel coding rate to the second predetermined channel coding rate and changing the length of the received packet from the first predetermined packet length to the second predetermined packet length and J3) resetting the channel decoder of the receiving unit accordingly, K) wherein:
K1) upon receiving, by the channel decoder of the receiving unit from the first transceiver of the transmitting unit, a predetermined number of consecutive error-free packets, K2) sending, by the channel decoder of the receiving unit, a signal for resetting the selectable encoder of the transmitting unit from the second predetermined channel coding rate to the first predetermined channel coding rate and changing the length of the received packet from the second predetermined packet length to the first predetermined packet length and K3) resetting the channel decoder of the receiving unit accordingly, wherein, for steps H–K the second predetermined channel coding rate is less than the first predetermined channel coding rate and the second predetermined packet length is less than the first predetermined packet length, F) and a data sink, operably coupled to the channel decoder, for receiving decoded received data.

7. The communication system of claim 6 wherein, for a 2.4 GHz propagation environment and a nominal one Megabit per second data transmission rate, the first predetermined channel coding rate is approximately 97 percent and the second predetermined channel coding rate is approximately 70 percent.

8. The communication system of claim 6 wherein, for a 2.4 GHz propagation environment and a nominal one Megabit per second data transmission rate, the first predetermined packet length is in a range from 15 ms to 50 ms and the second predetermined packet length is in a range from 1 ms to 5 ms.

* * * * *

UNITED STATES PATENT AND TRADEMARK OFFICE
CERTIFICATE OF CORRECTION

PATENT NO. : 5,490,168
DATED : 02/06/96
INVENTOR(S) : Sharon E.T. Phillips and Scott N. Carney It is certified that error appears in the above-indentified patent and that said Letters Patent is hereby corrected as shown below:

Column 8, Line 43, "oacket" should be --packet--

Signed and Sealed this

Sixteenth Day of July, 1996

Attest:

BRUCE LEHMAN

Attesting Officer

Commissioner of Patents and Trademarks